United States Patent [19]
Benesh et al.

[11] Patent Number: 4,960,438
[45] Date of Patent: Oct. 2, 1990

[54] BRIQUETTE AN RELATED PROCESS

[75] Inventors: Yoel Benesh; Tony L. Bark, both of Highland Park, Ill.

[73] Assignee: The Barkesh Company

[21] Appl. No.: 357,942

[22] Filed: May 30, 1989

[51] Int. Cl.$^5$ .............................................. C10L 5/44
[52] U.S. Cl. .......................................... 44/589; 44/605
[58] Field of Search .................. 44/589, 590, 605, 606

[56] References Cited

U.S. PATENT DOCUMENTS

| | | |
|---|---|---|
| 308,714 | 12/1884 | Van Gulpen . |
| 469,086 | 2/1892 | Kling ...................................... 44/590 |
| 2,341,377 | 2/1944 | Hinderer ................................ 44/590 |
| 3,709,700 | 1/1973 | Ross ....................................... 44/606 |
| 4,272,322 | 6/1981 | Kobayashi ............................. 44/589 |
| 4,874,396 | 10/1989 | McLeod .................................. 44/589 |

FOREIGN PATENT DOCUMENTS

| | | |
|---|---|---|
| 366360 | 12/1938 | Italy . |
| 427123 | 11/1947 | Italy . |
| 162338 | 12/1980 | Japan ..................................... 44/589 |
| 2076 | of 1885 | United Kingdom . |

*Primary Examiner*—Carl F. Dees
*Attorney, Agent, or Firm*—Irwin C. Alter

[57] ABSTRACT

New and improved briquettes and a process for using the briquettes for both flavoring and heating food when ignited whereby the briquettes have a residual amount of olive oil which, upon ignition, not only heats food but flavors it with the oiled vapors.

12 Claims, 1 Drawing Sheet

BRIQUETTE AN RELATED PROCESS

BACKGROUND

This invention relates to an article and process dealing with briquettes that use olive by-products for both heat and food flavoring as well.

The prior art relating to briquettes and specifically to ones made of olive oil by-products illustrate that the manufacturers of briquettes that employed olive residue did not appreciate that a synergistic result could be obtained where the briquettes were made with olive residue that had oil remaining therein wherein the briquettes, upon being ignited, not only provided a means for kindling but also presented a means of flavoring food being cooked on a grill so that the dual purpose of food preparation and heating became an improved way to both heat and flavor food.

As an example of prior art where olive residue is involved, the British Patent, entitled "Improvements in the Manufacture of Fire Lighters", A.D. 1885, Feb. 14, No. 2076 shows a typical use of olive residue used in kindling where the olive residue is specifically defined as having the oil "expressed" from the residue Other patents, such as U.S. Pat. No. 308,714, issued on Dec. 2, 1884, to Carl Van Gulpen, teach thoroughly pulverized residue of various matter and fruits being used for heating rather than food flavoring. Italian Patent No. 427,123, while being directed to briquettes that are meant for kindling, does have pine cones mixed therein which the patent claims provides for a pleasant smell while burning due to the aromatic substance contained in the pine cone resin. However, this patent is not, in any way, directed toward flavoring food with the vapor residue of a briquette but also it is no closer to the invention than the ordinary briquettes or fire logs that are for kindling or heat where the aromatic substances contained therein give a nice scent to the atmosphere.

The present invention is a new and improved briquette that can be used for both flavoring and heating and the ingredients thereof include a residual amount of olive oil so that upon ignition and heating it creates flavoring to food.

Thus the object of this invention is to provide a new and improved briquette that has the advantage providing heat from an ignited fire as well as the ability to flavor food by means of vaporized olive oil given off from the smoke of the briquette.

It is further an object of this invention to provide a process for flavoring cooked foods with olive oil wherein the briquette is made in a way that allows olive oil to be entrapped in the briquettes by the use of molding olive byproducts such as olive pulp and pits into the form of a briquette and thereafter setting fire to the briquette in order to create heat that vaporizes the entrapped olive oil and causes the vapor to flavor food disposed thereabove.

Still even further an object of this invention is to provide a briquette that is made of natural non-toxic ingredients that not only provides fire but also provides a means for flavoring food with olive oil vapor.

BRIEF DESCRIPTION OF THE DRAWINGS

Other and further objects of the invention will become more readily apparent from reading the accompanying specification together with the drawings wherein.

Figure 1:
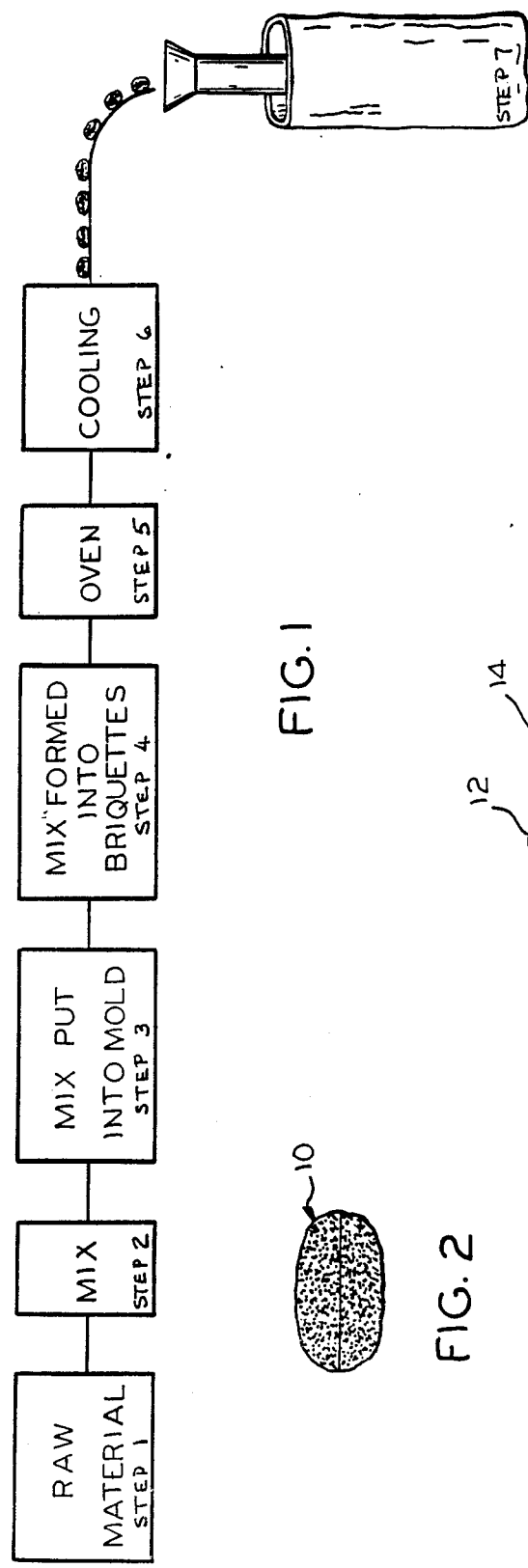
FIG. 1 is a diagram showing the steps of making the briquettes.
Figure 2:
FIG. 2 is a representation of the briquettes after they have been molded.
Figure 3:
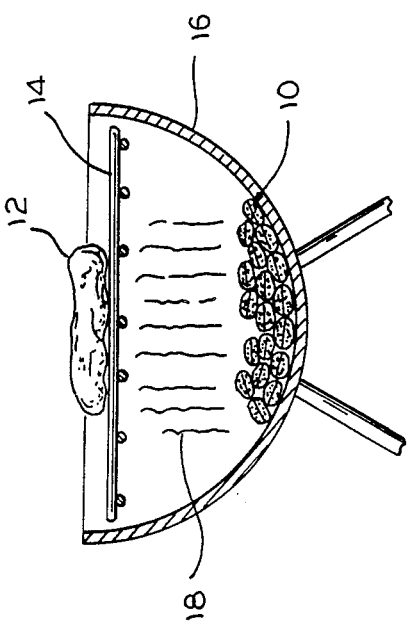
FIG. 3 illustrates meat being barbecued and smoked with the flames and olive vapors given off from the briquettes.

The novel briquette 10 is similar in size and shape to regular barbecue briquettes and is made preferably by first mixing olive pits and olive pulp in a range of from 25–50% seeds and 50–75% pulp. The amount of seeds to pulp depends on the oil quality of the pulp. Then a glue or amylose such as flour and water is added in the amount of approximately 8% of the total amount of the mixture. The low range and high range of the glue is from 5–20%. The greater the oil in the pulp, the less seeds or pits that are needed. Thus, the briquette can be made up of the mixture of pulp, seeds and glue which can be close to 98 or 99%. Such a mixture has from 5–25% olive oil therein.

Also, to prevent smell and fermentation, citric acid, to the extent of 0.01 to 0.1%, can be added. However, any nontoxic preservative such as ascorbic acid, sodium benzoate or ascetic acid may be used. The range of preservative may be as high as 1% of the total mixture where the glue is flour and water. But if the glue is Dextrin, the preservative could be 0.01% of the total product. Generally, the raw materials (Step 1) are mixed until a homogenous consistency is obtained that is represented by Step 2, whereafter the dough is placed into, preferably, porous molds (represented by Steps 3 and 4, not specifically shown) and is heated for about 20 minutes to approximately 375 degrees Fahrenheit or 190 degrees Centigrade (Step 5). If there are more solids in the glue, the baking time could be increased since the amount of baking time is inversely proportional to the amount of solids in the glue. When finished baking, the mold is removed from the convection oven and placed in a cooling system for purposes of cooling the briquettes to allow their removal (Step 6), whereupon the briquettes are removed from the molds and are fed to Step 7 for packaging. Other alternative ways to work the process to economize on energy includes removing the briquettes prior to baking and thereby save energy in heating the mold. Thus, the exact order of removing the mold and briquettes can be changed without changing the scope of the invention.

In experimentation with manufacturing the briquettes, it was found that the briquettes originally fermented and smelled offensive until an organic, non-toxic preservative, such as citric acid was added to the glue mixture to thereby halt the fermentation without changing the quality of the briquette. The low range and high range of citric acid or the equivalent thereof is 0.01–1%.

It should be recognized that with the product described it can be seen that by using all natural ingredients, that are non-toxic, and providing olive oil in the briquette so as to enable it to vaporize and permeate meats that are cooked on a grill while the briquettes are used for heating, a new and improved process for heating and flavoring food as well as a new and improved briquette is provided. The low range and high range of olive oil in the mixture of raw materials is 5–15% in raw material; 5–25% in finished cooked product. The process includes the step of placing the meat 12 to be barbecued and flavored on a grill 14, placing the briquettes below the grill in a kettle 16 or the like, and igniting the briquettes so that the meat can be barbecued and flavored with the vapor in the smoke 18 of the briquettes 10. For best results, it is recommended that the briquettes are used on top of charcoal briquettes of the type readily available. This is more economical and saves money by using the less expensive charcoal briquettes for fire and heat.

While the foregoing is presented as an example of the invention, it is anticipated that others, skilled in the art will perceive differences which while deferring from the foregoing, do not depart from the spirit and scope of the invention as described and claimed.

What is claimed:

1. In a briquette that can be used for smoke flavoring and barbecuing wherein a number of briquettes that have been molded to a briquette shape and held together by a non-toxic glue whereby said briquettes can be used to heat and flavor foods supported and proximately located to the smoke and heat directed therefrom, a briquette made of a homogenous mixture of olive residue including olive pits and olive pulp wherein there is some olive oil that is still a part of the olive residue, and said non-toxic glue holds the olive residue together whereby when the briquettes are ignited they can act to flavor and barbecue through the heat and olive oil vapors given off from the smoke of the inflamed briquettes.

2. A briquette as defined in claim 1 wherein the olive pulp and pits can be present in a range of between 25-50% pits and 50-75% pulp in order to still maintain favorable heating and flavoring characteristics when ignited.

3. A briquette as defined in claim 1, wherein a citric acid is added to the glue in order to keep the mixture from fermenting without changing the kindling quality of the briquettes.

4. A briquette as defined in claim 1 wherein the briquettes are made by homogenously mixing the ingredients of the briquette to a dough-like consistency and placing the dough into porous metal molds that are shaped like briquettes, baking the dough for a period of about twenty minutes and removing the briquettes whereby the ingredients are free from water but still have enough olive oil residue for flavoring of food by smoking when the briquettes are ignited.

5. A process for manufacturing briquettes that can be used for heating and flavoring food, where the briquettes are molded with an olive residue that has olive oil contained therein whereby barbecuing and smoking can be achieved with said briquettes, including the steps of:

(a) mixing the olive residue with a non-toxic glue and citric acid so that it has a dough-like consistency;

(b) depositing said dough mixture in a mold that is in the shape of a briquette, baking for a period of time that achieves exhaustion of water from the mixture, cooling after baking and removal from said mold after baking.

6. A burnable briquette for barbecuing and the like which comprises a bonded-together mixture of ground olive pits and olive pulp, said mixture containing from 5 to 25 weight percent of olive oil and being substantially dried.

7. A burnable briquette for barbecuing and the like which comprises from 98 to 99 weight percent of a mixture of ground olive seeds and olive pulp, said mixture having an olive oil content of 5 to 25 weight percent; and from 1 to 2 weight percent of a burnable, non-toxic binder.

8. The briquette of claim 8 in which said burnable, non-toxic binder is carbohydrate-based.

9. The briquette of claim 8 which contains a non-toxic antimicrobial agent to suppress microbial growth in said briquette.

10. The briquette of claim 9 which said anti-microbial agent is citric acid in a concentration of one to four percent by weight.

11. The briquette of claim 10 in which said mixture of ground olive pits and olive pulp contains from 40 to 60 percent by weight of olive pulp.

12. A process for manufacturing briquettes which are burnable for barbecuing or the like, which comprises mixing together from 80 to 95 weight percent of a mixture of ground olive pits and olive pulp, which mixture contains (A) from 5 to 25 weight percent of olive oil and (B) from 5 to 20 weight percent of a non-toxic, burnable binding agent to form a mixture of the approximate consistency of bread dough; molding portions of said dough-like mixture into the shape of briquettes; and heating said molded briquettes to harden the briquettes and to cause removal of water.

* * * * *